US010317848B2

(12) United States Patent
Nakamura et al.

(10) Patent No.: US 10,317,848 B2
(45) Date of Patent: Jun. 11, 2019

(54) TIME INFORMATION DISPLAY DEVICE

(71) Applicant: HONDA MOTOR CO., LTD., Tokyo (JP)

(72) Inventors: Yusuke Nakamura, Wako (JP); Nobuaki Asahara, Wako (JP); Yosuke Fuchiwaki, Wako (JP); Atsuyuki Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 15/404,658

(22) Filed: Jan. 12, 2017

(65) Prior Publication Data

US 2017/0199499 A1 Jul. 13, 2017

(30) Foreign Application Priority Data

Jan. 12, 2016 (JP) ................................ 2016-003383

(51) Int. Cl.
*G04G 9/00* (2006.01)
*H04L 29/08* (2006.01)

(52) U.S. Cl.
CPC ............ *G04G 9/0076* (2013.01); *H04L 67/12* (2013.01)

(58) Field of Classification Search
CPC .............................. G04G 9/0076; G04R 20/06
See application file for complete search history.

(56) References Cited

U.S. PATENT DOCUMENTS

| | | | | |
|---|---|---|---|---|
| 5,455,807 A * | 10/1995 | Nepple | G04G 9/0076 | 368/21 |
| 6,278,660 B1 * | 8/2001 | Tognazzini | G04G 9/0076 | 368/21 |
| 2006/0002238 A1 * | 1/2006 | Morris | G04G 9/0076 | 368/47 |
| 2010/0135124 A1 * | 6/2010 | Hirano | G04G 9/0076 | 368/14 |
| 2015/0146503 A1 * | 5/2015 | Nakanishi | G04R 20/02 | 368/21 |
| 2017/0123382 A1 * | 5/2017 | Ruzicka | G04G 9/0076 | |

FOREIGN PATENT DOCUMENTS

JP 2010-127808 A 6/2010

* cited by examiner

*Primary Examiner* — Edwin A. Leon
*Assistant Examiner* — Jason M Collins
(74) *Attorney, Agent, or Firm* — Westerman, Hattori, Daniels & Adrian, LLP

(57) ABSTRACT

An information display device includes: a communications part that receives, from multiple external devices, information on a time zone of the current position identified by the multiple external devices; a time zone-identification part that identifies a time zone of the current position of the self-device, on the basis of the information received from the multiple external devices; and a display control part that displays time in the identified time zone of the current position on a display part, in which the time zone-identification part repeatedly calculates, for a first predetermined time length, an accumulated time in which time zones received from a predetermined number of the external devices match one another, and when the accumulated match time is not shorter than a predetermined time, identifies the matched time zone as the time zone of the current position.

12 Claims, 6 Drawing Sheets

TIME INFORMATION DISPLAY DEVICE

CROSS REFERENCES TO RELATED APPLICATIONS

The present application claims priority under 35 U.S.C. § 119 to Japanese Patent Application No. 2016-003383, filed Jan. 12, 2016, entitled "Time Information Display Device." The contents of this application are incorporated herein by reference in their entirety.

TECHNICAL FIELD

The present disclosure relates to a device (time information display device) that has a function of displaying time information, and particularly relates to a time information display device that is installed in a movable body such as a vehicle, and can automatically correct the displayed time information according to the time zone of the current position of the self-device.

BACKGROUND

A device installed in a movable body such as a vehicle and displaying time should desirably display the correct standard time of the time zone of its current position, even when the self-device moves between time zones with different standard times. As a device for detecting such crossing of a time zone boundary and correcting the displayed time, a conventional time display control device has been known (Japanese Patent Application Publication No. 2010-127808) in which the current position of the self-device is detected on the basis of a GPS (Global Positioning System) signal, for example, whether or not the self-device has crossed a time zone boundary is determined by referring to map information including time zone information, and if the device crosses the time zone boundary, time information held in the self-device is corrected and displayed. Furthermore, to prevent too frequent changes in the displayed time and bothering the driver when driving on a road that frequently crosses a time zone boundary, the device sets an area at a predetermined distance from the time zone boundary, and changes the displayed time only when the vehicle goes beyond the predetermined distance-area toward the destination time zone.

However, the position of the self-device located by the GPS signal generally includes an error, and due to this error, it may sometimes be difficult to accurately detect whether or not the vehicle has crossed a time zone boundary. To improve the accuracy in locating the current position of the self-device, in the field of navigation systems, for example, a method has been known in which the position of the device is calculated by use of a GPS signal, and the calculated position is matched with a road position on a map stored in the self-device (so-called map matching).

However, generally, map information stored in an onboard device such as an onboard navigation system is rarely updated, and if the map information is updated only at the time of a vehicle inspection, there may be a certain period when the device uses map information that does not include latest information such as newly constructed roads. Accordingly, since onboard devices such as an onboard navigation system do not use latest map information, errors may occur in position location by map matching.

As a result, even if the displayed time is kept unchanged within a predetermined distance from a time zone boundary as in the conventional device described above, an error in current position location accuracy may cause frequent changes in the displayed time, depending on the value of the predetermined distance. Additionally, if the area of the predetermined distance is enlarged to avoid such frequent changes in the displayed time, the time may be displayed incorrectly over a needlessly wide area, and usefulness of the time information display device may be degraded.

Meanwhile, in recent years, some multifunction mobile terminals such as a smartphone have a GPS function or a map matching function to locate the position of the self-device and perform navigation, or determine the time zone of the current position of the self-device to correct and display time information. Such a mobile terminal communicates with a server, for example, through radio communication or the like, and can always access latest map information. However, since such a mobile terminal cannot include a large high-performance device in view of balance with required lightness, for example, generally, location accuracy of the GPS function tends to be lower than an onboard GPS device.

For this reason, in a multifunction mobile terminal, a GPS position calculation error may cause an error in position location by map matching. This may cause fluctuation in displayed time near the time zone boundary, in a manner different from the aforementioned onboard device whose map information may cause an error in position location.

SUMMARY

In a time information display device installed in a movable body such as a vehicle, it is desirable to effectively prevent fluctuation in displayed time near a time zone boundary that may occur due to accuracy in locating the position of the self-device, for example.

An aspect of the present disclosure includes: a communications part that receives, from multiple external devices different from the self-device, information on a time zone of the current position identified by the multiple external devices; a time zone-identification part that identifies a time zone of the current position of the self-device, on the basis of the information received from the multiple external devices; and a display control part that displays time in the identified time zone of the current position on a display part. The time zone-identification part is configured to: determine whether or not the time zone received from the multiple external devices matches a time zone of the current position previously identified by the time zone-identification part; when the time zone received from at least one of the external devices does not match the time zone of the current position previously identified by the time zone-identification part, repeatedly calculate, for a first predetermined time length, an accumulated time in which time zones received from a predetermined number of the external devices match one another; and when the accumulated match time is not shorter than a predetermined time, identify the matched time zone as the time zone of the current position.

According to another aspect of the present disclosure, the first predetermined time length is set on the basis of one or multiple factors including: speed of the self-vehicle in which the self-device is installed; an angle between a time zone boundary line nearest to the self-device and a running direction of the self-vehicle; the degree of linearity of the time zone boundary; the degree of linearity of a road on which the self-vehicle runs; and presence or absence of degradation in location accuracy of at least one of the external devices.

According to another aspect of the present disclosure, the higher the speed of the self-vehicle, the shorter the first predetermined time length is set.

According to another aspect of the present disclosure, the closer the angle between the time zone boundary line and the running direction of the self-vehicle is to a right angle, the shorter the first predetermined time length is set.

According to another aspect of the present disclosure, the higher the linearity of the time zone boundary, and/or the higher the linearity of the road on which the self-vehicle runs, the shorter the first predetermined time length is set.

According to another aspect of the present disclosure, when location accuracy of at least one of the external devices is deteriorated, the first predetermined time length is set shorter than when the location accuracy is not deteriorated.

According to another aspect of the present disclosure, the time zone-identification part is also configured to, when the time zone received from the multiple external devices does not match the time zone of the current position previously identified by the time zone-identification part, for at least one of the external devices, repeatedly calculate each of accumulated times in which the time zone received from the at least one external device matches a first time zone and a second time zone that sandwich a time zone boundary nearest to the self-device, during a latest second predetermined time length period, and also repeatedly calculate a first time ratio that is a ratio of the accumulated time that matches the first time zone to the second predetermined time length, and a second time ratio that is a ratio of the accumulated time that matches the second time zone to the second predetermined time length; and the display control part is also configured to display a time of the first time zone and a time of the second time zone on the display part, in display modes based on the first time ratio and the second time ratio, respectively.

According to another aspect of the present disclosure, the display control part is also configured to: display the time of the first time zone on the display part in a larger size for a larger first time ratio; and display the time of the second time zone on the display part in a larger size for a larger second time ratio.

BRIEF DESCRIPTION OF THE DRAWINGS

The advantages of the disclosure will become apparent in the following description taken in conjunction with the following drawings.

DETAILED DESCRIPTION

Hereinafter, embodiments of the present disclosure will be described with reference to the drawings.

[First Embodiment]

First, a time information display device of a first embodiment of the present disclosure will be described. The time information display device of the embodiment is installed in a vehicle (hereinafter referred to as self-vehicle), and displays time information on an onboard display. The time information display device may be a part of a so-called DA (Display Audio) that includes a display device to display television programs, and provides audio functions such as radio broadcasting and music playback, for example.

Figure 1:
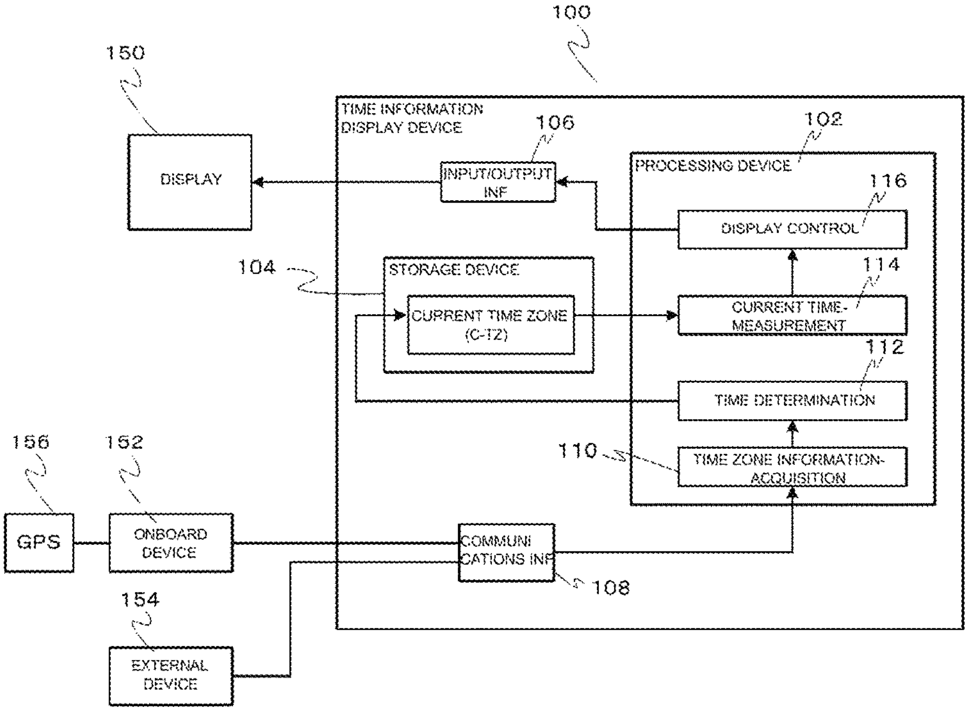
FIG. 1 is a block diagram showing a configuration of a time information display device of a first embodiment of the present disclosure.

FIG. 1 is a block diagram showing a configuration of the time information display device of the first embodiment of the present disclosure. A time information display device 100 has a processing device 102 and a storage device 104. Also, the time information display device 100 includes: an input/output interface (input/output INF) 106 that relays data exchange between a display 150 provided inside the vehicle, and the processing device 102; and a communications interface (communications INF) 108 that relays data exchange between the processing device 102, and an onboard device 152 installed in the vehicle as well as external device 154 such as a smartphone taken into the vehicle and used.

The display 150 is a liquid crystal display with a touch panel, for example.

The onboard device 152 is an onboard navigation system, for example, and acquires information on the current position of the self-vehicle from an onboard GPS device 156, for example, determines the time zone of the current position of the self-vehicle by referring to map information included in the onboard device 152, for example, and transmits information on the determined time zone to the time information display device 100 at predetermined intervals, autonomously or in response to requests from the time information display device 100.

The external device 154 is a multifunction cellular telephone such as a smartphone, or a multifunction mobile terminal (Personal Digital Assistant) such as a portable PC, locates the current position by receiving GPS radio waves or radio waves from cellular base stations, and determines the time zone of the current position of the self-device by referring to map information acquired from a remote server, for example, by radio communication or the like. Also, the external device 154 transmits information on the determined time zone to the time information display device 100 at predetermined intervals, autonomously or in response to requests from the time information display device 100.

The above-mentioned functions of the onboard device 152 and the external device 154 may be implemented by executing an application program on a computer (not shown), included in each of the onboard device 152 and the external device 154, for example.

The communication INF 108 included in the time information display device 100 may be a wire communication-interface compliant with a communication standard such as USB, for example. Note, however, that the communications INF 108 is not limited to this, and may be a wireless communication-interface compliant with a standard such as Bluetooth communication and Wi-Fi communication, or may be a communications interface that performs both of such wireless communication and wire communication mentioned above.

The storage device 104 may be a storage device configured of a volatile or nonvolatile memory (e.g., semiconductor memory), or a hard disk, for example. A time determination unit 112 (to be described later) included in the processing device 102 stores, in the storage device 104, information on the time zone of the current position determined by the time determination unit 112.

Hereinafter, the time zone of the current position determined by the onboard device 152 will be referred to as E-TZ, the time zone of the current position determined by the external device 154 will be referred to as D-TZ, and the time zone of the current position determined by the time determination unit 112 based on E-TZ and D-TZ will be referred to as C-TZ.

The processing device 102 is a computer having a processor such as a CPU (Central Processing Unit), a ROM (Read Only Memory) into which a program is written, and a RAM (Random Access Memory) for temporarily storing data, for example, and includes a time zone information-acquisition unit 110, the time determination unit 112, a current time-measurement unit 114, and a display control unit 116. Here, the communications INF 108 and the time zone information-acquisition unit 110 correspond to a communications part, the time determination unit 112 corresponds to a time zone-identification part, and the display control unit 116 corresponds to a display control part.

The above units included in the processing device 102 are implemented by execution of a program by the processing device 102 as the computer, and the computer program can be stored in an arbitrary computer readable storage medium. Instead, or in addition to this, all or some of the above units may each be configured of hardware including one or more electronic circuit parts.

The time zone information-acquisition unit 110 acquires, at predetermined intervals, information on the current position-time zone E-TZ determined by the onboard device 152 and information on the current position-time zone D-TZ determined by the external device 154 from the onboard device 152 and the external device 154, by transmitting request signals to the onboard device 152 and the external device 154 or simply waiting for data transmission from the onboard device 152 and the external device 154, and sends the information to the time determination unit 112.

The time determination unit 112 determines (or identifies) the current position-time zone C-TZ, on the basis of the current position-time zone E-TZ determined by the onboard device 152 and the current position-time zone D-TZ determined by the external device 154, which are received through the time zone information-acquisition unit 110.

To be more specific, the time determination unit 112 compares E-TZ and D-TZ acquired at predetermined intervals, and repeatedly measures an accumulated time $t_{match}$ in which E-TZ and D-TZ match, over a predetermined time length (determination time $t_{det}$) period (i.e., in determination time $t_{det}$ cycles). Then, every time the determination time $t_{det}$ elapses, the time determination unit calculates a time ratio $R_0$ (=$t_{match}/t_{det}\times100$(%)) of the accumulated time $t_{match}$ to the determination time $t_{det}$, and determines whether or not the time ratio $R_0$ exceeds a predetermined threshold $R_{th}$. If the time ratio $R_0$ exceeds the predetermined threshold $R_{th}$, the time determination unit determines that the matched time zone is the current position-time zone C-TZ, and stores information on the current position-time zone C-TZ in the storage device 104.

The current time-measurement unit 114 measures elapsed time with a timer (not shown) included in the processing device 102, for example, and calculates and identifies the current time in the current position by referring to the time zone (C-TZ) of the current position stored in the storage device 104. Also, the current time-measurement unit 114 transmits information on the identified current time in the current position to the display control unit 116.

The display control unit 116 displays the current time in the current position received from the current time-measurement unit 114 on the display 150, through the input/output INF 106.

The time information display device 100 configured in the above manner repeatedly measures the accumulated time $t_{match}$ in which the current position-time zones E-TZ and D-TZ respectively determined by the onboard device 152 and the external device 154 match to each other, over the predetermined time length $t_{det}$ period, and if the time ratio $R_0$ of the accumulated time $t_{match}$ to the predetermined time $t_{det}$ exceeds the predetermined threshold $R_{th}$, determines that the matched time zone is the time zone of the current position. Then, the time information display device displays the time corresponding to the determined time zone on the display 150.

Accordingly, instead of keeping the displayed time unchanged within a predetermined distance from a time zone boundary as in the conventional technique, the time information display device 100 repeatedly calculates the degree of coincidence (specifically, aforementioned time ratio $R_0$) between time zone determination results depending on characteristics (e.g., current position information accuracy and map information accuracy) of the onboard device 152 and the external device 154, in cycles of the predetermined time length $t_{det}$, and determines the time zone when the degree of coincidence exceeds a predetermined level (i.e., when time ratio $R_0$ exceeds threshold $R_{th}$). Hence, the time information display device can identify the time zone more promptly and accurately, and prevent fluctuation in displayed time that may occur near a time zone boundary.

Next, a procedure of processing of the time determination unit 112 of the time information display device 100 will be described according to the flowchart of FIG. 2. The processing starts when the time information display device 100 is powered on, and ends when it is powered off. Note that the display 150, the onboard device 152, the external device 154, and the GPS device 156 start operation before or at the same time as powering on the time information display device 100. Additionally, in parallel with the processing, the time zone information-acquisition unit 110 acquires, at predetermined intervals, information on the current position-time zone E-TZ determined by the onboard device 152 and information on the current position-time zone D-TZ determined by the external device 154, from the onboard device 152 and the external device 154, and transmits them to the time determination unit 112.

When the processing is started, the time determination unit 112 first acquires the latest data on the current position-time zone E-TZ determined by the onboard device 152, transmitted from the time zone information-acquisition unit 110 (S100). Next, the time determination unit 112 determines whether or not the time zone C-TZ identified as the time zone of the current position is stored in the storage device 104 (S102), and if it is not stored (S102, No), stores E-TZ acquired in step S100 in the storage device 104 as C-TZ (S104), and returns to step S100 to repeat the processing.

Meanwhile, if C-TZ is stored in the storage device 104 (S102, Yes), the time determination unit determines whether or not E-TZ acquired from the onboard device 152 in step S100 and C-TZ stored in the storage device 104 match to each other (S106), and if they match (S106, Yes), determines that the time information display device 100 (i.e., self-vehicle including the time information display device 100) is not crossing a time zone boundary or is not approaching a time zone boundary, and returns to step S100 to repeat the processing.

Meanwhile, if E-TZ acquired from the onboard device 152 and C-TZ stored in the storage device 104 do not match to each other (S106, No), the time determination unit determines that the time information display device 100 (or self-vehicle) has crossed a time zone boundary or is approaching a time zone boundary, and proceeds to step S108. In other words, when E-TZ acquired from the onboard device 152 changes from C-TZ stored in the storage device 104, the time determination unit determines that the time information display device 100 or the self-vehicle has crossed a time zone boundary or is approaching a time zone boundary, and performs the processing in step S108 and following steps. Instead, the time determination unit may acquire the current time zone (D-TZ) from the external device 154 in step S100, and when D-TZ changes from C-TZ stored in the storage device 104, determine that the time information display device 100 or the self-vehicle has crossed a time zone boundary or is approaching a time zone boundary. Or the time determination unit may acquire both of the current time zone E-TZ of the onboard device 152 and the current time zone D-TZ of the external device 154 in step S100, and when E-TZ or D-TZ changes from C-TZ stored in the storage device 104, determine that the time information display device 100 or the self-vehicle has crossed a time zone boundary or is approaching a time zone boundary.

In step S108, the time determination unit 112 sets the determination time $t_{det}$, which is a first predetermined time length, to a predetermined value, and starts measuring elapsed time $t_{elps}$. The elapsed time $t_{elps}$ may be measured with a timer (not shown) included in the time information display device 100, for example.

Next, the time determination unit 112 measures or calculates an accumulated time (matched time) $t_{match}$ in which the time zone (E-TZ) determined by the onboard device 152 and the time zone (D-TZ) determined by the external device 154 match to each other during the determination time $t_{det}$, based on E-TZ and D-TZ acquired at predetermined intervals through the time zone information-acquisition unit 110 (S110). The matched time $t_{match}$ may be calculated by the following equation, for example.

$$t_{match}=N\times\Delta t$$

Here, N is the number of times E-TZ and D-TZ match after the start of measurement in step S108, and Δt is the interval at which E-TZ and D-TZ are determined by the onboard device 152 and the external device 154.

Then, the time determination unit 112 determines whether or not the elapsed time $t_{elps}$ exceeds the determination time $t_{det}$ (S112), and if not (S112, No), returns to step S108 to repeat the processing. Meanwhile, if the elapsed time $t_{elps}$ exceeds the determination time $t_{det}$ (S112, Yes), the time determination unit calculates the time ratio $R_0$ of the accumulated time $t_{match}$ to the determination time $t_{det}$ (S114), and then determines whether or not the time ratio $R_0$ exceeds the predetermined threshold $R_{th}$ (S116). And if $R_0$ does not exceed $R_{th}$ (S116, No), the time determination unit returns to step S108 to repeat the processing. Thus, the time determination unit repeats calculation of the matched time $t_{match}$ and the time ratio $R_0$ periodically by using the determination time $t_{det}$ as one cycle, until the time ratio $R_0$ of the matched time $t_{match}$ of E-TZ and D-TZ within the one cycle exceeds the predetermined threshold $R_{th}$.

Note that when measuring the matched time $t_{match}$ in step S110, if E-TZ and/or D-TZ is changing between a time zone A and a time zone B that sandwich a time zone boundary near the current position, for example, the time determination unit measures each of a matched time $t_{match}$-A in which both of E-TZ and D-TZ are the time zone A, and a matched time $t_{match}$-B in which both of E-TZ and D-TZ are the time zone B. Also, similarly, when calculating the time ratio $R_0$ in step S114, the time determination unit calculates each of a time ratio $R_0$-A of the matched time $t_{match}$-A and a time ratio $R_0$-B of the matched time $t_{match}$-B.

Then, if any of the time ratios $R_0$ (i.e., any of aforementioned time ratio $R_0$-A and time ratio $R_0$-B) exceeds the predetermined threshold $R_{th}$ (S116, Yes), the time determination unit identifies the time zone corresponding to the time ratio $R_0$ that exceeded the predetermined threshold $R_{th}$ (e.g., time zone A if time ratio $R_0$-A exceeds predetermined threshold $R_{th}$, or time zone B if time ratio $R_0$-B exceeds predetermined threshold $R_{th}$) as the current position-time zone C-TZ and stores it in the storage device 104 (S118), and then returns to step S100 to repeat the processing.

Figure 3:
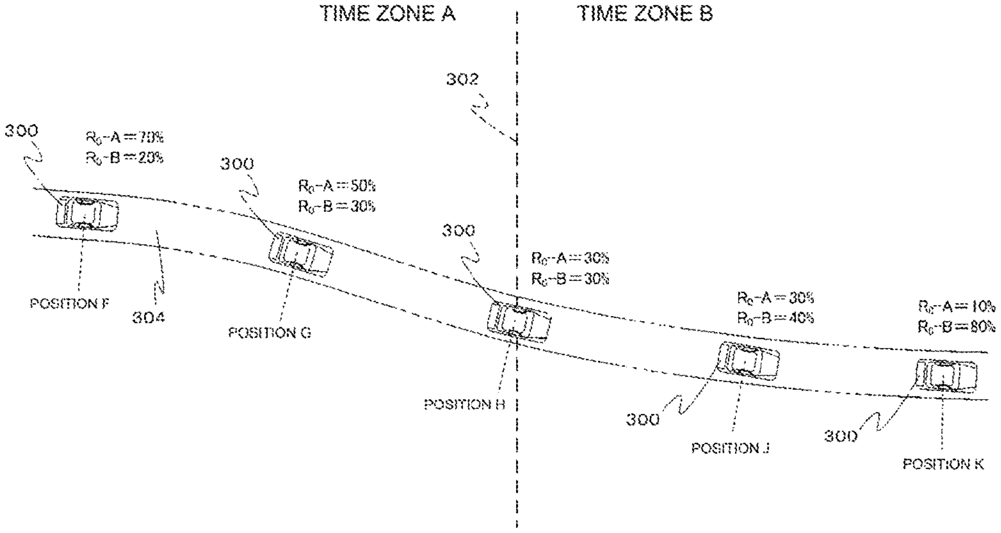
FIG. 3 is a diagram for describing an example of operation of the time information display device of FIG. 1, when crossing a time zone boundary.

FIG. 3 is a diagram for describing an example of operation of the time information display device 100 when a vehicle in which the time information display device 100 is installed crosses a time zone boundary. In FIG. 3, a vehicle 300 in which the time information display device 100 is installed runs from the time zone A to the time zone B, on a road 304 that crosses a time zone boundary 302 separating the time zone A from the time zone B. Note that for the sake of clarity, FIG. 3 shows the vehicle 300 having reached positions F, G, H, J, and K in the drawing, to indicate temporal change in position of the vehicle 300 running on the road 304. In addition, each of the time ratio $R_0$-A of the matched time $t_{match}$-A when E-TZ and D-TZ are both the time zone A, and the time ratio $R_0$-B of the matched time $t_{match}$-B when E-TZ and D-TZ are both the time zone B at the positions F to K in FIG. 3 are shown as examples, near the drawings of the vehicle 300 in the respective positions. Note that in this example, the threshold $R_{th}$ of the time ratio $R_0$ is 60%, and in position F, the current time zone C-TZ stored in the storage device 104 of the time information display device 100 installed in the vehicle 300 is the time zone A.

Figure 2:
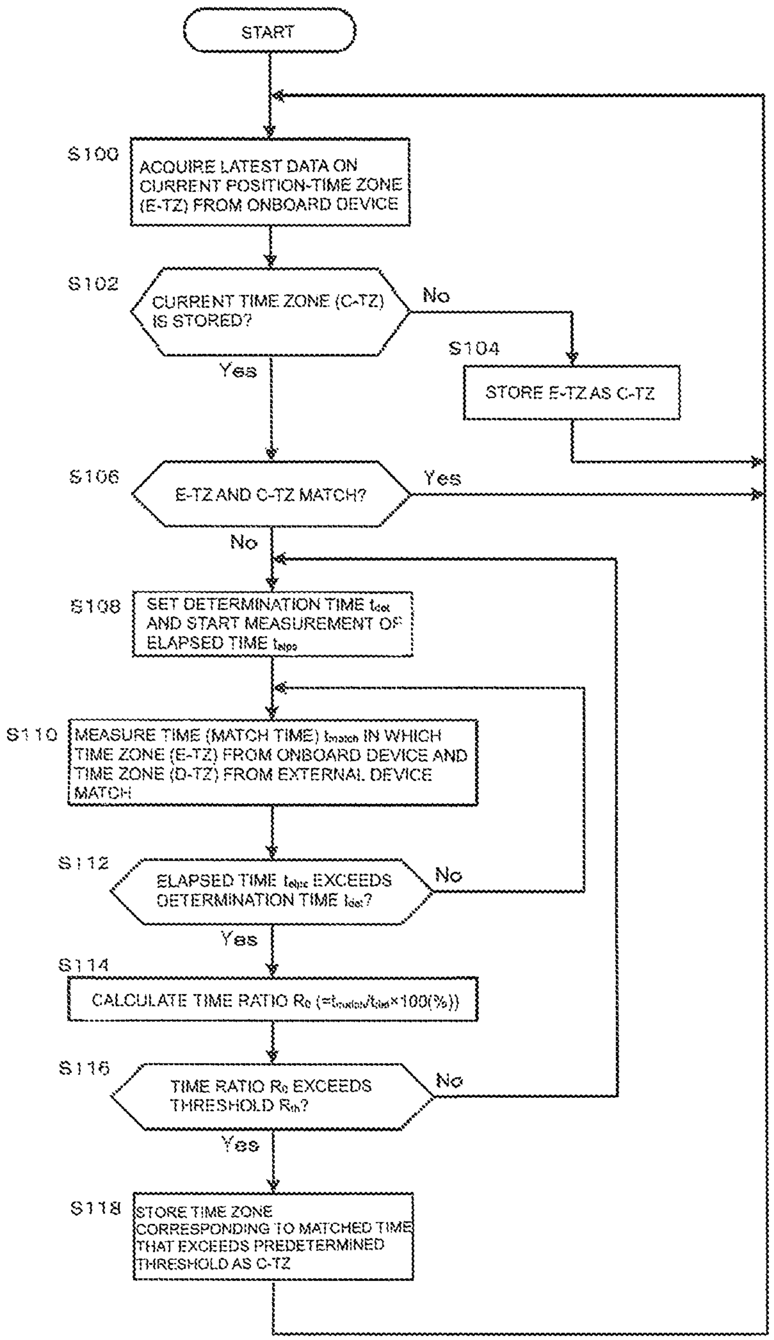
FIG. 2 is a flowchart showing a procedure of processing of a time determination unit of the time information display device of FIG. 1.

When the vehicle 300 approaches the time zone boundary 302 from the left in FIG. 3 on the road 304 and reaches position F, the current position location accuracy of the onboard device 152 (e.g., location accuracy of GPS device 156 connected to onboard device 152, or accuracy of map information included in onboard device 152) causes the current position-time zone E-TZ of the onboard device 152 to indicate the time zone B, which is different from the time zone A indicated by the current time zone C-TZ stored in the storage device 104 (steps S100 and S102, and No in S106 of FIG. 2). Hence, the time determination unit 112 calculates the time ratio $R_0$-A and the time ratio $R_0$-B (steps S108 to S114 of FIG. 2), and obtains $R_0$-A=70% and $R_0$-B=20%, as in FIG. 3. In this example, Since Rth=60% as mentioned above, and $R_0$-A(70%)>$R_{th}$(60%), the time determination unit 112 identifies the time zone A as the current time zone C-TZ, and stores the time zone A as the current time zone C-TZ in the storage device 104 (steps S116, S118 of FIG. 2). Accordingly, in position F, the current time zone C-TZ stored in the storage device 104 is still the time zone A, and the time displayed on the display 150 by the current time-measurement unit 114 and the display control unit 116 does not change from the standard time of the time zone A.

When the vehicle 300 further approaches the time zone boundary 302 and reaches position G, the time determination unit 112 calculates the time ratio $R_0$-A and the time ratio $R_0$-B in a procedure similar to that described above. Although position G is closer to the time zone boundary 302 than position F, it is still within the time zone A, and therefore the time determination unit obtains numeric values $R_0$-A=50%, $R_0$-B=30% where $R_0$-A>$R_0$-B, for example, as in FIG. 3. Then, since $R_{th}$(60%)>$R_0$-A(50%)>$R_0$-B(30%) (No in step S114 of FIG. 2), the time determination unit 112 continues calculation of the time ratios $R_0$-A, $R_0$-B without identifying the current time zone C-TZ. Accordingly, in this position G, too, the current time zone C-TZ stored in the storage device 104 is still the time zone A, and the standard time of the time zone A is still displayed on the display 150.

The vehicle 300 continues to run on the road 304, and reaches position H on the time zone boundary. The time determination unit 112 calculates the time ratios $R_0$-A=30%, $R_0$-B=30%, as in FIG. 3, and since $R_{th}$(60%)>$R_0$-A (30%)=$R_0$-B(30%) (No in step S114 of FIG. 2), continues calculation of the time ratios $R_0$-A, $R_0$-B without identifying the current time zone C-TZ. Accordingly, in position H, too, the current time zone C-TZ stored in the storage device 104 does not change from the time zone A, and the standard time of the time zone A is still displayed on the display 150.

Next, the vehicle 300 crosses the time zone boundary 302 and enters the time zone B, and reaches position J. The time determination unit 112 calculates the time ratios $R_0$-A=30%, $R_0$-B=40%, as in FIG. 3, and since $R_{th}$(60%)>$R_0$-B (40%)>$R_0$-A(30%) (No in step S114 of FIG. 2), continues calculation of the time ratios $R_0$-A, $R_0$-B without identifying the current time zone C-TZ. Accordingly, in position J, too, the current time zone C-TZ stored in the storage device 104 does not change from the time zone A, and the standard time of the time zone A is still displayed on the display 150.

Then, when the vehicle 300 moves away from the time zone boundary 302 and further into the time zone B to position K, the time determination unit 112 calculates the time ratios $R_0$-A=10%, $R_0$-B=80%, as in FIG. 3. Then, since $R_0$-B(80%)>$R_{th}$(60%), the time determination unit 112 identifies the time zone B as the current time zone C-TZ, and stores the time zone B as the current time zone C-TZ in the storage device 104 (steps S116, S118 of FIG. 2). Thus, in position K, the time displayed on the display 150 is switched from the standard time of the time zone A to the standard time of the time zone B.

As described above, in the time information display device 100, the current time zone C-TZ stored in the storage device 104 (i.e., current time zone C-TZ used for displaying time) does not change from the time zone A, in positions G to J near the time zone boundary 302 where $R_0$-A and $R_0$-B are not larger than $R_{th}$, and the current time zone C-TZ is only changed to the time zone B in position K where $R_0$-B takes a value that exceeds $R_{th}$. Hence, fluctuation in displayed time that may occur near the time zone boundary 302 can be suppressed, as compared to a conventional configuration where the time zone is determined by using only one of the onboard device 152 and the external device 154 to change the displayed time.

Also, in the time information display device 100, the current time zone C-TZ is changed to the time zone B in position K where $R_0$-B takes a value that exceeds $R_{th}$ (i.e., position of changing current time zone C-TZ is determined based on value of $R_0$-B), as described above. Hence, if the value of $R_0$-B exceeds $R_{th}$ in position J that is closer to the time zone boundary 302 depending on the individual difference of the location accuracy (or time zone determination accuracy) of the onboard device 152 and the external device 154, the current time zone C-TZ is changed to the time zone B in the position J (i.e., earlier, before vehicle 300 reaches position K), and the standard time of the time zone B is displayed on the display 150. Accordingly, the time information display device 100 can prevent a problem that incorrect time is displayed over a needlessly wide area, so that excellent usefulness of the time information display device can be maintained.

Note that although in the embodiment, the determination time $t_{det}$ as the cycle of measuring the matched time $t_{match}$ of E-TZ and D-TZ is set to a predetermined time (step S108), the invention is not limited to this. Instead, the determination time $t_{det}$ may be adaptively shortened or extended relative to the predetermined time, on the basis of one or multiple factors including: speed of the self-vehicle including the time information display device 100; an angle between a time zone boundary line and the running direction of the self-vehicle; the degree of linearity of the time zone boundary; the degree of linearity of the road on which the self-vehicle runs; and presence or absence of degradation in location accuracy of the GPS device 156 used by the onboard device 152 and/or the external device 154 (e.g., presence or absence of degradation in location accuracy (e.g., reception quality of GPS radio waves), assumed from geographic features (periphery of cliff, street canyon, surroundings of avenue, for example) of current position indicated by map information).

More specifically, the determination time $t_{det}$ may be set in the following manner.

(1) Speed

At high speed, the self-vehicle, after passing a time zone boundary, is assumed to move away quickly from the boundary area where time zone identification tends to fluctuate. Hence, the determination time $t_{det}$ may be set shorter than the predetermined time, by multiplying the predetermined time by a predetermined coefficient K1 smaller than 1, for example. Note that the value of K1 may be a continuous value that decreases with increase in speed (e.g., value inversely proportional to speed).

(2) Angle Between Time Zone Boundary Line and Running Direction of Self-Vehicle

The closer an angle between a time zone boundary line and the running direction of the self-vehicle is to a right angle, the quicker the self-vehicle is assumed to move away from the time zone boundary area where time zone identification tends to fluctuate, after passing the boundary. Hence, the determination time $t_{det}$ may be set shorter than the predetermined time, by multiplying the predetermined time by a predetermined coefficient K2 smaller than 1, for example. Note that the value of K2 may be a continuous value that decreases with decrease in an angle of deviation from a right angle (90 degrees), of the angle between the time zone boundary line and the running direction of the self-vehicle (e.g., value proportional to angle of deviation).

(3) Linearity of Time Zone Boundary or Road on which Self-Vehicle Runs

When a time zone boundary or the road on which the self-vehicle runs has low linearity and is winding, the vehicle is assumed to stay longer within the boundary area where time zone identification tends to fluctuate. Hence, the determination time $t_{det}$ may be set longer than the predetermined time, by multiplying the predetermined time by a coefficient K3 larger than 1, for example, to prevent fluctuation in the displayed time caused by fluctuation in time zone identification. Note that the value of K3 may be a continuous value that increases with increase in a meander width per predetermined distance along the time zone boundary or the road on which the self-vehicle runs (e.g., value proportional to deviation distance (maximum value of distance deviation in direction perpendicular to approximate straight line of the time zone boundary or road) of the time zone boundary or road from the approximate straight line, within predetermined distance).

(4) GPS Accuracy

When it is assumed that location accuracy of the GPS device 156 used by the onboard device 152 and/or the external device 154 is deteriorated (e.g., when deterioration of GPS location accuracy is assumed from geographic features (periphery of cliff, street canyon, surroundings of avenue, for example) of current position indicated by map information), the determination time $t_{det}$ may be set longer than the predetermined time when the deterioration is not assumed, by multiplying the predetermined time by a coefficient K4 larger than 1, for example, to prevent fluctuation in the displayed time caused by fluctuation in time zone identification.

(5) Combination of Above (1) to (4)

When at least two of the above (1) to (4) conditions are applicable, the determination time $t_{det}$ may be set in view of the respective conditions, by successively multiplying the predetermined time by the coefficients K1 to K4 set for the respective conditions.

Also, although in the embodiment, the time information display device 100 acquires the determination result of the time zone of the current position from two external devices (i.e., onboard device 152 and external device 154), the invention is not limited to this. Instead, the determination result of the time zone of the current position may be acquired from three or more external devices. In this case, instead of steps S100 to S102 and S103 of FIG. 2, it may be determined that the self-device has crossed a time zone boundary or is approaching the boundary, when the time zone acquired from at least one of the external devices differs from C-TZ stored in the storage device 104. Additionally, instead of step S110 of FIG. 2, an accumulated time in which time zones received from the predetermined number of external devices match may be measured as the matched time $t_{match}$.

[Second Embodiment]

Next, a time information display device of a second embodiment of the present disclosure will be described. In addition to the functions of the time information display device 100 of the first embodiment, when determining that the vehicle has crossed a time zone boundary between a first time zone and a second time zone or is approaching the time zone boundary, the time information display device of the embodiment measures an accumulated time $t_1$ in which a time zone E-TZ determined by an onboard device 152 is the first time zone, and an accumulated time $t_2$ in which the time zone E-TZ is the second time zone, for each measurement time $t_{mes}$, which is the latest second predetermined time length. Then, the information display device displays both of the current time of the first time zone and the current time of the second time zone on a display 150, in display modes respectively based on a ratio R1 of the accumulated time $t_1$ to the measurement time $t_{mes}$ and a ratio R2 of the accumulated time $t_2$ to the measurement time $t_{mes}$.

Thus, the time information display device of the second embodiment allows the user to intuitively grasp the likelihood that the current position belongs to the first time zone and that the current position belongs to the second time zone, from the display modes of the two times displayed on the display 150.

Also, the time information display device repeatedly calculates times $t_1$ and $t_2$ for the latest measurement time $t_{mes}$ period. In other words, every time the time zone E-TZ determined by the onboard device 152 is acquired at the predetermined interval, the time information display device repeats calculation of the times $t_1$ and $t_2$ as well as R1 and R2 for the latest measurement time $t_{mes}$ period, and updates the modes of time display. Hence, the user can know, in real time, changes in the likelihood that the current position belongs to the first time zone and that the current position belongs to the second time zone. As a result, the user can know from the above-described changes that the self-vehicle is approaching or moving away from a time zone boundary, for example, or that the road is meandering relative to the time zone boundary and therefore the distance to the time zone boundary from the vehicle is varying, for example.

Figure 4:
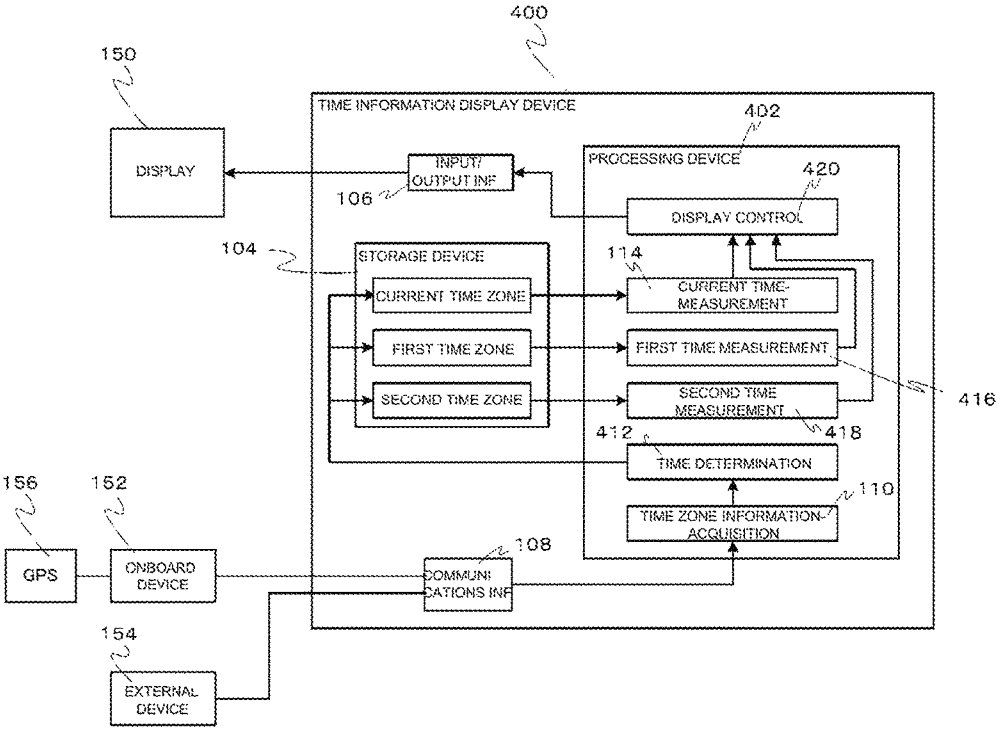
FIG. 4 is a block diagram showing a configuration of a time information display device of a second embodiment of the present disclosure.

FIG. 4 is a diagram showing a configuration of the time information display device of the second embodiment. Note that in FIG. 4, the same components as those shown in FIG. 1 are assigned the same reference numerals as in FIG. 1, and the above description of FIG. 1 will be used.

A time information display device 400 of the embodiment has a similar configuration as the time information display device 100 of the first embodiment shown in FIG. 1, but is different in that it has a processing device 402 instead of the processing device 102. In addition, although the processing device 402 has a similar configuration as the processing device 102 shown in FIG. 1, it has a time determination unit 412 and a display control unit 420 instead of the time determination unit 112 and the display control unit 116. Additionally, the processing device 402 also has a first time measurement unit 416 and a second time measurement unit 418. Here, the time determination unit 412 corresponds to a time zone-identification part, and the display control unit 420 corresponds to a display control part.

The above units included in the processing device 402 are implemented by execution of a program by the processing device 402 as a computer, and the computer program can be stored in an arbitrary computer readable storage medium. Instead, or in addition to this, all or some of the above units may each be configured of hardware including one or more electronic circuit parts.

As in the case of the time determination unit 112 of the first embodiment, the time determination unit 412 determines a current position-time zone (current time zone) C-TZ, on the basis of the current position-time zone E-TZ determined by the onboard device 152 and a current position-time zone D-TZ determined by an external device 154, through a time zone information-acquisition unit 110, and stores information on the time zone C-TZ in a storage device 104.

Moreover, when determining that the vehicle has crossed a time zone boundary between the first time zone and the second time zone or is approaching the time zone boundary, the time determination unit 412 measures the accumulated time $t_1$ in which the time zone E-TZ determined by the onboard device 152 is the first time zone, and the accumulated time $t_2$ in which the time zone E-TZ is the second time zone, for each measurement time $t_{mes}$, which is the latest second predetermined time length. The time determination unit also calculates the ratio (first time ratio) R1 of the accumulated time $t_1$ to the measurement time $t_{mes}$, and the ratio (second time ratio) R2 of the accumulated time $t_2$ to the measurement time $t_{mes}$. Then, the time determination unit 412 stores the information identifying the first time zone and the first time ratio R1 in the storage device 104 as first time zone information, and stores the information identifying the second time zone and the second time ratio R2 in the storage device 104 as second time zone information. Note that every time the time zone E-TZ determined by the onboard device 152 is acquired at the predetermined interval from the onboard device 152, the time determination unit 412 repeats calculation of the accumulated time $t_1$ and accumulated time $t_2$ as well as R1 and R2, for the latest measurement time $t_c$, period.

Figure 5:
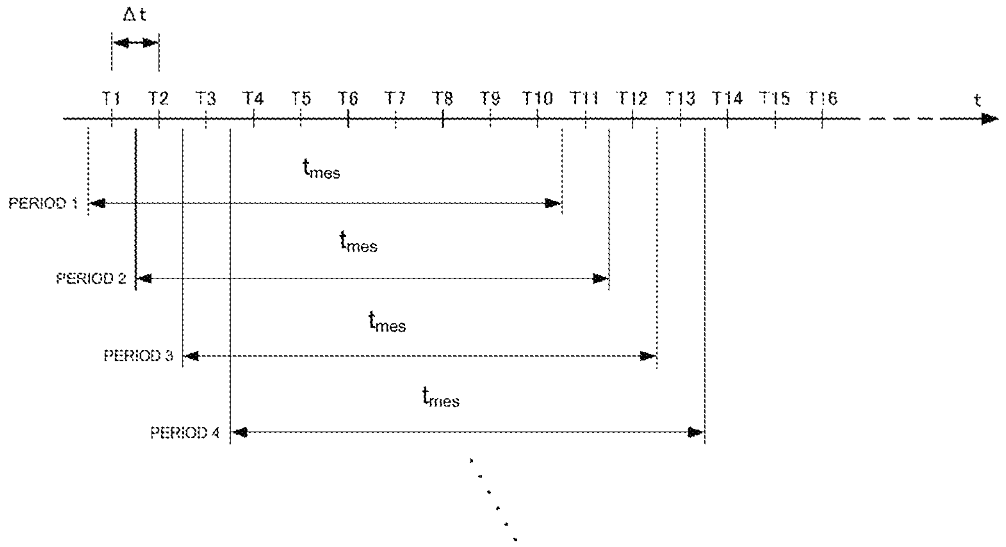
FIG. 5 is a diagram for describing the measurement period for calculating first and second time ratios of the time information display device of FIG. 4.

FIG. 5 is a diagram for describing the measurement period for calculating the accumulated times $t_1$, $t_2$ as well as the first and second time ratios R1, R2. In FIG. 5, the horizontal axis indicates the flow of time t. Times T1, T2, . . . T15, . . . are spaced apart from one another at constant intervals Δt, and the time zone information-acquisition unit 110 repeatedly acquires the current position-time zone E-TZ from the onboard device 152 at these times. The measurement time $t_{mes}$ may be set as a multiple of Δt, for example, and is set to $t_{mes}=\Delta t\times 10$ in the example of FIG. 5.

When the current time reaches time T10, for example, a period 1 in FIG. 5 is regarded as the measurement time $t_{mes}$ period closest to the current time, and the time determination unit 412 calculates the accumulated times $t_1$, $t_2$ and the time ratios R1, R2 by use of ten E-TZs acquired in time T1 to T10 within the period 1. Assuming that E-TZ acquired in time Tn (n=1, 2, . . . ) continues in period Tn−Δt/2~Tn+Δt/2, the values are calculated by use of the following equations.

$$t_1=N_{E\text{-}TZ=TZ1}(T1:T10)\times\Delta t$$

$$t_2=N_{E\text{-}TZ=TZ2}(T1:T10)\times\Delta t$$

$$R1=t_1/t_{mes}\times 100(\%)$$

$$R2=t_2/t_{mes}\times 100(\%)$$

Here, $N_{E\text{-}TZ=TZ1}$(T1:T10) is the number of E-TZs in which E-TZ=time zone 1 (i.e., the number of times when E-TZ=time zone 1), among E-TZs acquired during time T1 to T10, and $N_{E\text{-}TZ=TZ2}$(T1:T10) is the number of E-TZs in which E-TZ=time zone 2 (i.e., the number of times when E-TZ=time zone 2), among E-TZs acquired during time T1 to T10.

Then, when the current time reaches time T11, a period 2 in FIG. 5 is regarded as the measurement time $t_{mes}$ period closest to the current time, and the time determination unit 412 calculates the accumulated times $t_1$, $t_2$ and the time ratios R1, R2 by use of ten E-TZs acquired in time T2 to T11 within the period 2. More specifically, in equation (2), $N_{E\text{-}TZ=TZ1}$(T2:T11), which is the number of E-TZs in which E-TZ=time zone 1 among E-TZs acquired during time T2 to T11, is used instead of $N_{E\text{-}T=TZ1}$(T1:T10), and $N_{E\text{-}TZ=TZ2}$(T2:T11), which is the number of E-TZs in which E-TZ=time zone 2 among E-TZs acquired during time T2 to T11, is used instead of $N_{E\text{-}TZ=TZ2}$(T1:T10) to calculate the accumulated times $t_1$, $t_2$ and the time ratios R1, R2.

Thereafter, similarly, when the current time reaches T12, T13, . . . , periods 3, 4, . . . shown in FIG. 5 are respectively regarded as the measurement time $t_{mes}$ period closest to the current time, and the time determination unit calculates the accumulated times $t_1$, $t_2$ and the time ratios R1, R2 by use of ten E-TZs acquired in the respective periods 3, 4, . . . .

Referring back to FIG. 4, the first time measurement unit 416 measures elapsed time by use of a timer (not shown) included in the processing device 402, for example, and refers to the first time zone information stored in the storage device 104 to identify the current time of the first time zone indicated by the first time zone information. Also, the first time measurement unit 416 transmits information on the identified current time in the current position and the first time ratio R1 included in the first time zone information, to the display control unit 420.

Similarly, the second time measurement unit 418 measures elapsed time by use of a timer (not shown) included in the processing device 402, for example, and refers to the second time zone information stored in the storage device 104 to identify the current time of the second time zone indicated by the second time zone information. Also, the second time measurement unit 418 transmits information on the identified current time in the current position and the second time ratio R2 included in the second time zone information, to the display control unit 420.

As in the case of the display control unit 116 of the first embodiment, the display control unit 420 displays the current time in the current position received from a current time-measurement unit 114 on the display 150, through an input/output INF 106.

The display control unit 420 also refers to the first time zone information and the second time zone information stored in the storage device 104, and displays the current time of the first time zone and the current time of the second time zone on the display 150, in display modes based on the first and second time ratios R1, R2, respectively.

For example, the display control unit 420 displays the current time of the first time zone in a larger size for a larger first time ratio R1, and displays the current time of the second time zone in a larger size for a larger second time ratio R2, on a display screen of the display 150. More specifically, the display control unit displays the current time of the first time zone within an area S×R1/(R1+R2), and the current time of the second time zone within an area S×R2/(R1+R2), relative to a predetermined size area S on the display 150, for example.

Figure 6:
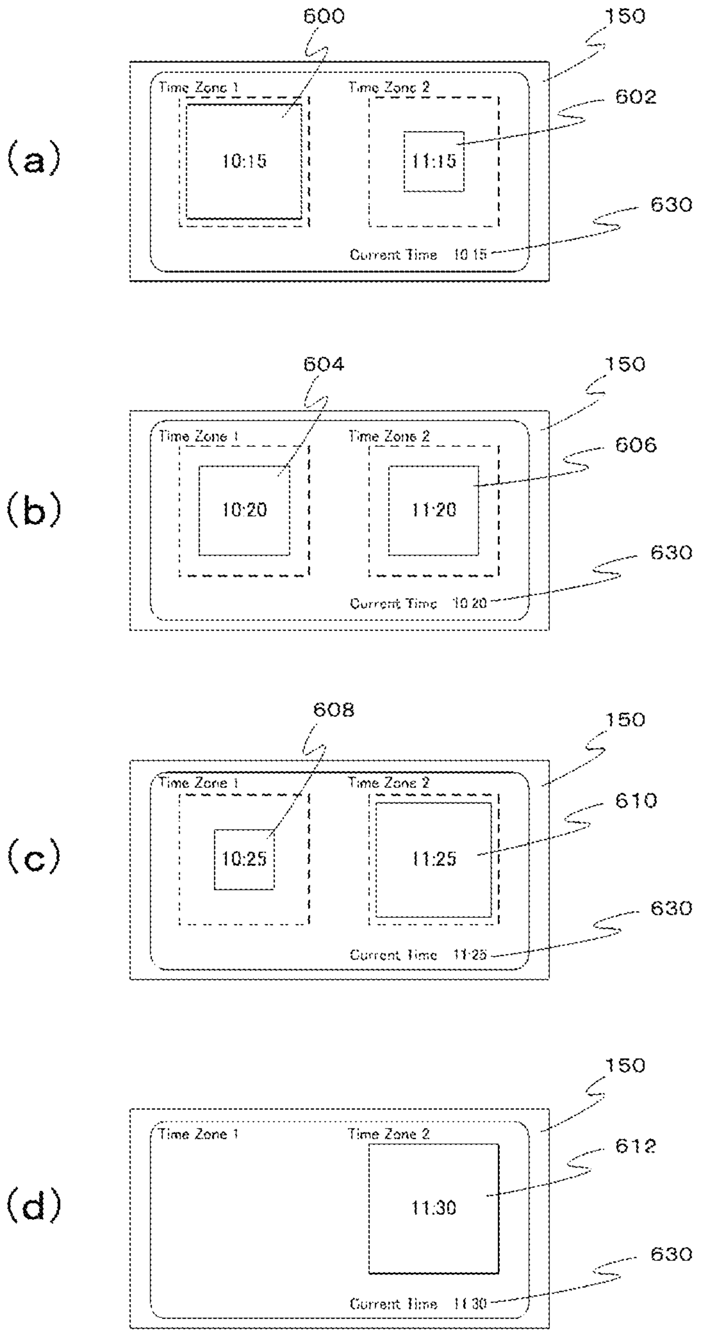
FIG. 6 is a diagram showing an example of times displayed in first and second time zones on the basis of the first and second time ratios.

FIG. 6 is a diagram showing an example of times displayed in first and second time zones on the basis of the first and second time ratios R1, R2. Parts (a) to (d) of FIG. 6 show changes in the times displayed in of the first and second time zones, when the time information display device 400 crosses a time zone boundary from the first time zone to the second time zone.

Part (a) of FIG. 6 shows the displayed time when the time information display device 400 is in the first time zone, and approaches the time zone boundary (more specifically, when it is determined No in S106 of processing similar to FIG. 2). According to the calculation of this example, the first time ratio R1 is 80% and the second time ratio R2 is 20%, for example, and the times are displayed on the display 150, such that display parts (rectangular parts surrounded by solid line in FIG. 6) of a first time display 600 and a second time display 602 form rectangular parts, whose areas are 80% and 20% of respective rectangular parts (dotted line in FIG. 6) having predetermined areas S. Note that a time 630 based on the current time zone C-TZ identified by the time determination unit 412 is also displayed on the display 150 in parts (a) to (d) of FIG. 6.

Part (b) of FIG. 6 shows the displayed time when the time information display device 400 is on the time zone boundary between the first time zone and the second time zone, for example, and the first and second time ratios R1, R2 are both 50%, for example. Here, the times are displayed such that display parts of a first time display 604 and a second time display 606 form rectangular parts, whose areas are both 50% of the respective rectangular parts (dotted line in FIG. 6) having the predetermined areas S.

Part (c) of FIG. 6 shows the displayed time when the time information display device 400 crosses the time zone boundary and enters the second time zone, for example. According to the calculation of this example, the first time ratio R1 is 20% and the second time ratio R2 is 80%, for example, and the times are displayed such that display parts of a first time display 608 and a second time display 610 form rectangular parts, whose areas are 20% and 80% of the respective rectangular parts (dotted line in FIG. 6) having the predetermined areas S.

Part (d) of FIG. 6 shows the displayed time when the time information display device 400 moves further away from the time zone boundary than in part (c) of FIG. 6, and into the second time zone, for example. According to the calculation of this example, the first time ratio R1 is 0% and the second time ratio R2 is 100%, for example, and therefore the first time display is eliminated, while only a second time display 612 is displayed in a rectangular part having the predetermined area S.

Note that the inside of the display parts indicated by reference numerals 600 to 610 may be in a different color from the background color, for example. Also, although the numbers showing the time are displayed in a fixed size inside the display parts indicated by the reference numerals 600 to 610 in FIG. 6, the invention is not limited to this. Instead, the numbers showing the time may be displayed in different sizes, as long as they stay within the display parts.

Moreover, instead of or in addition to displaying the times in display parts of sizes corresponding to the first and second time ratios R1, R2 as in FIG. 6, the current time of the first time zone may be displayed in a brightness P×R1/(R1+R2) and the current time of the second time zone may be displayed in a brightness P×R2/(R1+R2), relative to a predetermined brightness P of the display screen. Furthermore, the time of the first time zone and the second time zone may be displayed in different display colors based on the first and second time ratios R1, R2 (e.g., varying mixing ratio of red light in white light according to time ratios R1, R2), or the frequency at which the displayed times of the first time zone and the second time zone flash may be varied based on the time ratios R1, R2.

Next, a procedure of processing of the time determination unit 412 of the time information display device 400 will be described.

Figure 7:
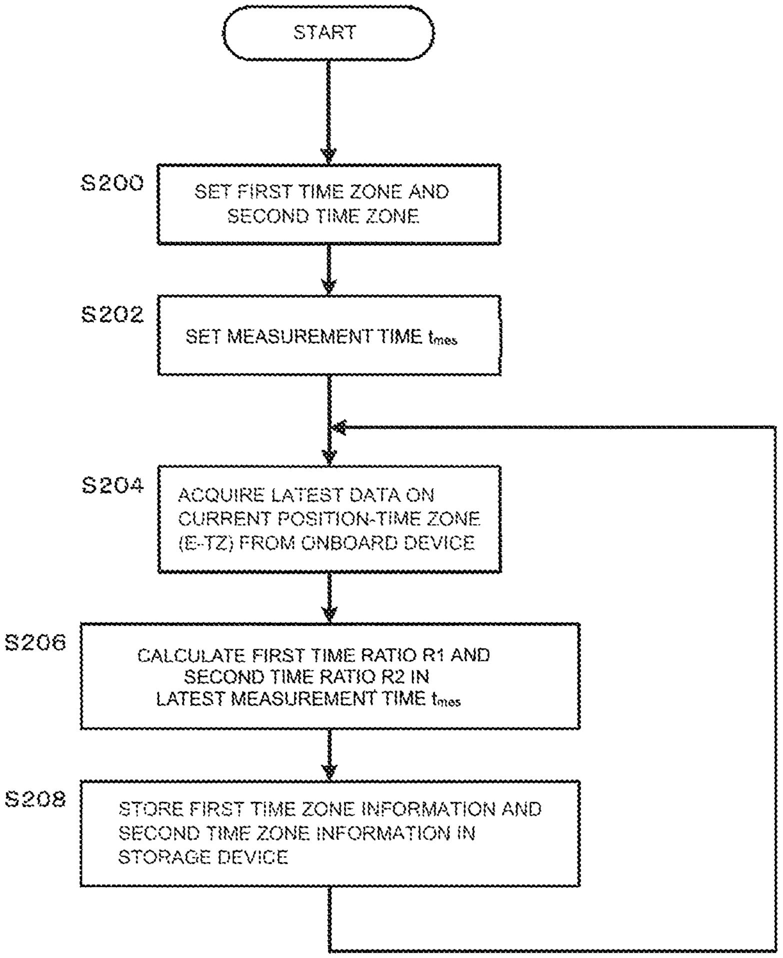
FIG. 7 is a flowchart showing a procedure of processing of a processing device of the time information display device of FIG. 4.

In addition to the same processing as in the time determination unit 112 of FIG. 2, the time determination unit 412 performs detailed display processing shown in FIG. 7, in parallel with the aforementioned processing. Note that the only difference in the processing similar to FIG. 2 performed by the time determination unit 412 is that the agent performing the steps is the time determination 412 instead of the time determination unit 112, and therefore the above description of FIG. 2 will be used.

Hereinbelow, the detailed display processing performed by the time determination unit 412 will be described, according to the flowchart shown in FIG. 7. This processing starts when it is determined No in S106 in the same processing as FIG. 2 performed by the time determination unit 412, that is, when it is determined that the time information display device 400 (or a vehicle including the time information display device 400 (hereinafter referred to as self-vehicle)) has crossed a time zone boundary or is approaching a time zone boundary. Also, this processing ends when the time determination unit 412 performs S116 in the same processing as FIG. 2, that is, when the time determination unit 412 identifies the current position-time zone C-TZ.

When the processing starts, the time determination unit 412 first sets C-TZ stored in the storage device 104 as the first time zone, and a time zone E-TZ most recently received from the onboard device 152 as the second time zone (S200). Next, the time determination unit 412 sets the measurement time $t_{mes}$ to a predetermined value (S202), and acquires the latest data on the current time zone (E-TZ) determined by the onboard device 152 (S204).

Next, the time determination unit 412 calculates the ratio (first time ratio) R1 of the accumulated time $t_1$ in which E-TZ is the first time zone, to the measurement time $t_{mes}$, and the ratio (second time ratio) R2 of the accumulated time $t_2$ in which E-TZ is the second time zone, to the measurement time $t_{mes}$, in the latest measurement time $t_{mes}$ (S206).

Then, the time determination unit 412 stores the first time zone information including information identifying the first time zone and the first time ratio R1 in the storage device 104, and stores the second time zone information including information identifying the second time zone and the second time ratio R2 in the storage device 104 (S208), and then returns to step S204 to repeat the processing.

Note that although in the embodiment, the first and second time ratios are obtained by use of the current position-time zone E-TZ determined by the onboard device 152, the invention is not limited to this. Instead, the first and second time ratios R1, R2 may be obtained by use of the current position-time zone D-TZ determined by the external device 154.

Additionally, although in the embodiment, the time information display device 400 acquires the determination result of the time zone of the current position from two external devices (i.e., onboard device 152 and external device 154), the invention is not limited to this. Instead, the determination result of the time zone of the current position may be acquired from three or more external devices, and the first and second time ratios may be obtained by use of the time zone of the current position determined by any one of the external devices.

Instead, the first and second time ratios R1, R2 may be obtained by using t1 as the accumulated time in which both of the time zone E-TZ determined by the onboard device 152 and the time zone D-TZ determined by the external device 154 are the first time zone, and t2 as the accumulated time in which both of E-TZ and D-TZ are the second time zone.

As has been described, the time information display devices 100 and 400 according to the first and second embodiments of the present disclosure repeatedly acquire, at predetermined intervals, the current position-time zones E-TZ and D-TZ respectively determined by the onboard device 152 and the external device 154 that locate the current position and determine the time zone of the current position, from the onboard device 152 and the external device 154; repeatedly measure the accumulated time in which E-TZ and D-TZ match, for a predetermined time length; and when the accumulated time exceeds a predetermined threshold, identify the matched time zone as the time zone of the current position. Then, the time information display devices display the time corresponding to the identified time zone on the display 150.

With this configuration, instead of keeping the displayed time unchanged within a predetermined distance from a time zone boundary as in the conventional technique, the time zone information display devices 100 and 400 of the first and second embodiments collect time zone determination results depending on characteristics (e.g., current position information accuracy and map information accuracy) of the onboard device 152 and the external device 154 for a predetermined time length. Hence, the time information display devices can identify the time zone more promptly and accurately, and prevent fluctuation in displayed time that may occur near a time zone boundary. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A time information display device comprising:

a communications part that receives, from a plurality of external devices different from the time information display device, information on a time zone of a current position identified by the plurality of external devices;

a time zone-identification part that identifies the time zone of the current position of the time information display device, using the information received from said plurality of external devices; and a display control part that displays time in said identified time zone of the current position on a display part, wherein said time zone-identification part is configured to:

determine whether or not the time zone indicated by the information received from said plurality of external devices matches a previously-identified time zone of the current position previously identified by said time zone-identification part;

when the time zone indicated by the information received from at least one of said external devices does not match the previously-identified time zone of the current position previously identified by said time zone-identification part, calculate, during a first predetermined time length, an accumulated match time in which one time zone indicated by the information received from one external device of the external devices matches another time zone indicated by the information received from another external device of the external devices; and when said accumulated match time is not shorter than a predetermined threshold time, identify the matched time zone as the time zone of the current position.

2. The time information display system according to claim 1, wherein said first predetermined time length is set in accordance with one or a plurality of factors including: speed of a self-vehicle in which the time information display device is installed; an angle between a time zone boundary line nearest to the time information display device and a running direction of said self-vehicle; the degree of linearity of said time zone boundary; the degree of linearity of a road on which said self-vehicle runs; and presence or absence of degradation in location identifying accuracy of at least one of said external devices.

3. The time information display device according to claim 2, wherein the higher the speed of said self-vehicle, the shorter said first predetermined time length is set.

4. The time information display device according to claim 2, wherein the closer the angle between said time zone boundary line and the running direction of said self-vehicle is to a right angle, the shorter said first predetermined time length is set.

5. The time information display device according to claim 2, wherein the higher the linearity of said time zone boundary, and/or the higher the linearity of the road on which said self-vehicle runs, the shorter said first predetermined time length is set.

6. The time information display device according to claim 2, wherein when the location identifying accuracy of at least one of said external devices is deteriorated, said first predetermined time length is set shorter than when the location identifying accuracy is not deteriorated.

7. The time information display device according to claim 1, wherein:

said time zone-identification part is also configured to, when the time zone indicated by the information received from said plurality of external devices does not match the previously-identified time zone of the current position previously identified by said time zone-identification part, for at least one of said external devices, during a latest second predetermined time length period, calculate a first accumulated match time in which the time zone indicated by the information received from the at least one external device matches a first time zone, and a second accumulated match time in which the time zone indicated by the information received from the at least one external device matches a second time zone, the first time zone and the second time zone sandwiching therebetween a time zone boundary nearest to the time information display device, and also calculate a first time ratio that is a ratio of said first accumulated match time to said second predetermined time length, and a second time ratio that is a ratio of said second accumulated match time to said second predetermined time length; and said display control part is also configured to display a first current time in said first time zone and a second current time in said second time zone on said display part, in respective display modes in accordance with said first time ratio and said second time ratio, respectively.

8. The time information display device according to claim 7, wherein said display control part is also configured to display the first current time on said display part in a larger size as said first time ratio becomes larger, and display the second current time on said display part in a larger size as said second time ratio becomes larger.

9. The time information display device according to claim 1, wherein the previously-identified time zone is stored in a storage device, when said accumulated match time is not shorter than the predetermined time, the time zone-identification part stores the identified time zone in the storage device.

10. The time information display device according to claim 1, wherein the external devices include a mobile terminal.

11. A time information display method comprising steps of:

(i) receiving by a computer, from a plurality of external devices via network, information on a time zone of a current position identified by the plurality of external devices;

(ii)identifying by a computer the time zone of the current position, using the information received from said plurality of external devices; and (iii)displaying time in said identified time zone of the current position on a display device, wherein the step (ii) comprising:

determining whether or not the time zone indicated by the information received from said plurality of external devices matches a previously-identified time zone of the current position, when the time zone indicated by the information received from at least one of said external devices does not match the previously-identified time zone, calculating, during a first predetermined time length, an accumulated match time in which one time zone indicated by the information received from one external device of the external devices matches another time zone indicated by the information received from another external device of the external devices; and when said accumulated match time is not shorter than a predetermined threshold time, identifying the matched time zone as the time zone of the current position.

12. A time information display device installed in a vehicle comprising:

a communication processor that receives, from a plurality of external devices different from the time information display device, information on a time zone of a current position of the vehicle identified by the plurality of external devices;

a time zone-identification processor that identifies the time zone of the current position of the vehicle, using the information received from said plurality of external devices; and a display controller that displays time in said identified time zone of the current position on a display device, wherein said time zone-identification processor is configured to:

determine whether or not the time zone indicated by the information received from said plurality of external devices matches a previously-identified time zone of the current position previously identified by said time zone-identification processor;

when the time zone indicated by the information received from at least one of said external devices does not match the previously-identified time zone, calculate, during a first predetermined time length, an accumulated match time in which one time zone indicated by the information received from one external device of the external devices matches another time zone indicated by the information received from another external device of the external devices; and when said accumulated match time is not shorter than a predetermined threshold time, identify the matched time zone as the time zone of the current position.

* * * * *